United States Patent [19]

Smith

[11] Patent Number: 4,678,296
[45] Date of Patent: Jul. 7, 1987

[54] NIGHT DRIVING DAZZLE PROTECTION SYSTEM

[76] Inventor: Robert B. Smith, 140 Westland Ave., Rochester, N.Y. 14618

[21] Appl. No.: 667,374

[22] Filed: Nov. 1, 1984

[51] Int. Cl.$^4$ .............................................. G02C 7/16
[52] U.S. Cl. ..................................................... 351/45
[58] Field of Search ....................... 351/45, 44, 46, 47, 351/48, 49

[56] References Cited

U.S. PATENT DOCUMENTS

| | | |
|---|---|---|
| Re. 16,862 | 1/1928 | Moran . |
| 1,257,667 | 2/1918 | Barr . |
| 1,676,760 | 7/1928 | Wilson . |
| 1,706,429 | 3/1929 | Willard . |
| 1,794,927 | 3/1931 | Smith et al. . |
| 1,828,850 | 10/1931 | Shryock . |
| 1,985,668 | 12/1934 | Peavey . |
| 2,012,620 | 8/1935 | Bean et al. . |
| 2,045,399 | 6/1936 | McMurdo . |
| 2,045,622 | 6/1936 | Thomson . |
| 2,109,115 | 2/1938 | Kleine . |
| 2,230,009 | 1/1941 | Ordorica . |
| 2,358,602 | 9/1944 | Snyder . |
| 2,409,356 | 10/1946 | Hutchings . |
| 2,445,153 | 7/1948 | Rearick . |
| 2,475,522 | 7/1949 | Scherkenbach . |
| 2,511,776 | 6/1950 | Kelly . |
| 2,598,272 | 5/1952 | Krimsky . |
| 2,639,430 | 5/1953 | Gale . |
| 2,675,740 | 4/1954 | Barkley . |
| 2,796,610 | 6/1957 | Doorenbos . |
| 2,875,670 | 3/1959 | Thornton . |
| 3,111,675 | 11/1963 | Mora ................. 351/45 X |
| 3,199,114 | 8/1965 | Malifaud . |
| 3,512,880 | 5/1970 | Alexander et al. . |
| 3,597,052 | 8/1971 | Dittman . |
| 3,664,733 | 5/1972 | Kalkowski . |
| 4,023,892 | 5/1977 | Smith . |
| 4,131,338 | 12/1978 | Zalewski . |

FOREIGN PATENT DOCUMENTS

| | | | |
|---|---|---|---|
| 1256439 | 12/1967 | Fed. Rep. of Germany | ........ 351/45 |
| 2469734 | 5/1981 | France | ............................. 351/45 |

*Primary Examiner*—Rodney B. Bovernick
*Attorney, Agent, or Firm*—Stonebraker, Shepard & Stephens

[57] ABSTRACT

A night driving dazzle protection system uses anti-dazzle screening material transmitting less than 40% of incident light and arranged on screened portions of right and left eyeglass regions 30 and 20 in front of a driver's eyes. As viewed by the driver, the eyeglass region 20 in the view of the driver's left eye is screened between about 7:30 o'clock and about 9:00 o'clock, and the corresponding eyeglass region 30 in the view of the driver's right eye is unscreened between about 7:30 o'clock and about 9:00 o'clock. Preferably, right and left eyeglass regions 30 and 20 between about 3:00 o'clock and about 4:30 o'clock are screened for the driver's right eye and unscreened for the driver's left eye. Also, upper portions of each of the eyeglass regions are preferably screened from about 9:00 o'clock to about 3:00 o'clock.

17 Claims, 3 Drawing Figures

FIG. I

NIGHT DRIVING DAZZLE PROTECTION SYSTEM

BACKGROUND

The problem of night driving dazzle from oncoming headlights has inspired many suggestions for screens positioned to shield the driver's eyes from headlight glare. My U.S. Pat. No. 4,023,892 recognized the problem of information deprivation from dazzle screens that diminish light from significant fields of view of both of the driver's eyes and suggested screening the left side of the field of view of the driver's right eye to provide adequate glare protection.

My continuing work on this problem has more completely analyzed the sources of night driving glare and has led to an even better way of protecting a driver's eyes from dazzle. I have now found that for oncoming headlight glare, superior dazzle protection with less loss of information can be achieved by limiting a dazzle screen to a carefully selected region in front of the driver's left eye and eliminating any dazzle screen from a corresponding region in front of the driver's right eye. I have also found better locations for dazzle protection screens eliminating night driving glare from other sources such as street lights, signs, and rear view mirrors. My improved system ensures that adequate light reaches the driver from all fields of view important for driving and yet a combination of screened and unscreened regions in front of the driver's eyes effectively protects night drivers from the glare of headlights and other sources.

SUMMARY OF THE INVENTION

My night driving dazzle protection system screens at least 60% of incident light viewed by the driver's left eye through a region extending from about 7:30 o'clock to about 9:00 o'clock and does not screen any incident light from the corresponding view of the driver's right eye in a region extending from about 7:30 o'clock to about 9:00 o'clock. This protects the driver from the glare of headlights that are oncoming or visible in the left side rear view mirror without reducing vital information from the field of view important for driving. I also prefer screening at least 60% of incident light from the view of both of the driver's eyes in an upper region extending from about 9:00 o'clock to about 3:00 o'clock to eliminate glare from overhead lights, upper regions of the windshield, and the inside rear view mirror. Additionally, I prefer screening at least 60% of incident light viewed by the driver's right eye through a region extending from about 3:00 o'clock to about 4:30 o'clock and not screening any incident light from the corresponding view of the driver's left eye in a region extending from about 3:00 o'clock to about 4:30 o'clock to eliminate glare from sources viewable to the driver's lower right, including the right side rear view mirror, without reducing vital driving information.

DRAWINGS

FIG. 1 is a driver's perspective view through a windshield to illustrate sources of night driving glare;

FIG. 2 is a perspective view of a pair of night driving eyeglasses having screened regions preferred according to my invention to protect the driver's eyes from the glare sources illustrated in FIG. 1 without reducing information vital to driving; and FIG. 3 is a cross-sectional view of a lens from the eyeglasses of FIG. 2 showing a glass and resin lamination preferred for screened eyeglasses according to the invention.

DETAILED DESCRIPTION

Figure 1:
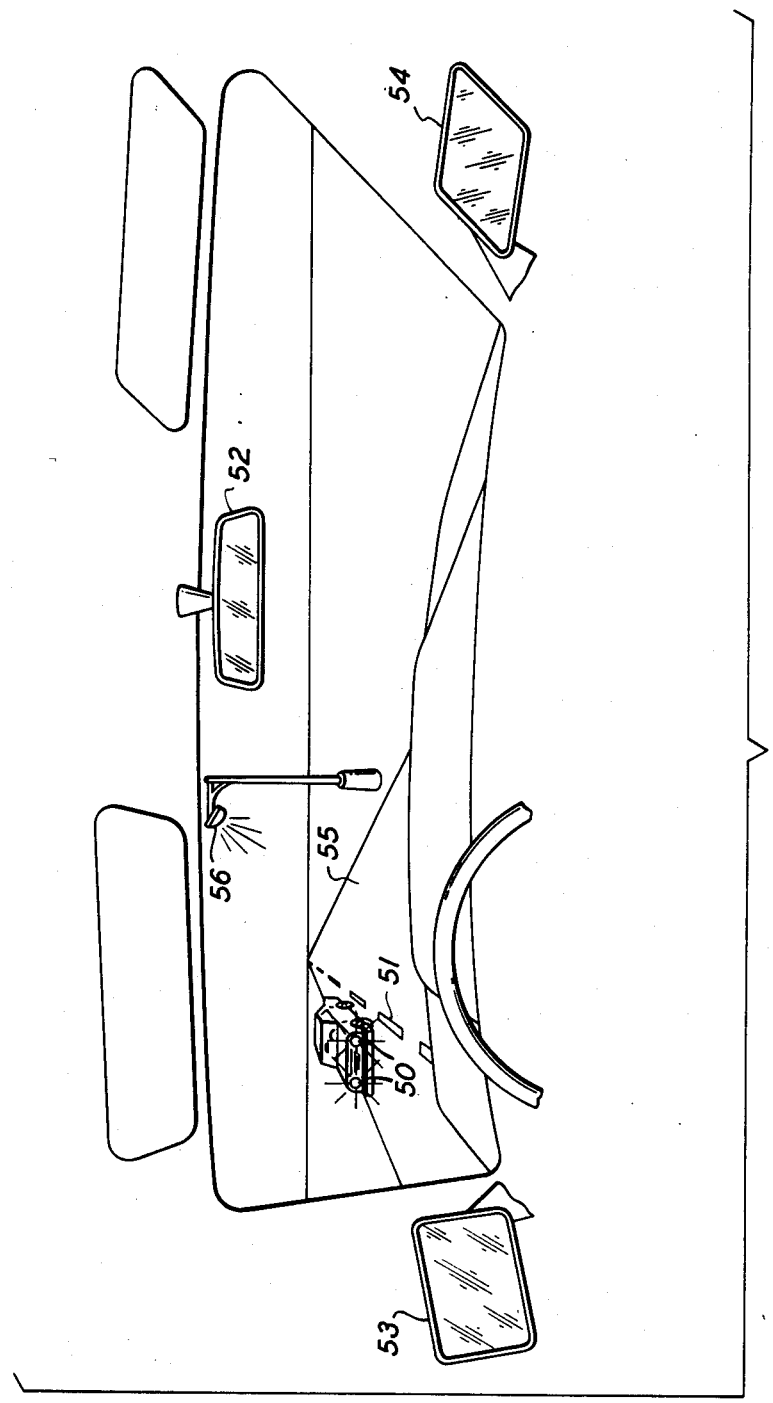

Sources of night driving glare are schematically illustrated in the driver's view of FIG. 1. One of the most troublesome of these is glare from oncoming headlights 50, usually to the left of the left edge 51 of a driving lane 55 extending ahead of the driver for travel by the driver's vehicle. Another glare source is inside rear view mirror 52 above and to the right of the center of the driver's view. Left side mirror 53 and right side mirror 54 can also be sources of glare from the headlights of trailing vehicles. Street light 56 represents a variety of overhead glare sources from lights outside the vehicle and from light reflected from dirt on the upper half of the windshield in front of the driver.

My system protects a driver from the discomfort of these glare sources without reducing the driver's visual information from regions that are vital for driving. I have found that anti-glare screening of light from regions viewed by both of the driver's eyes reduces visual information enought to give the driver an anxious or fearful feeling of proceeding without adequate information. I have also discovered that anti-dazzle screening can be effective without reducing the driver's information if it is properly placed in eyeglass regions in front of the driver's eyes.

Figure 2:
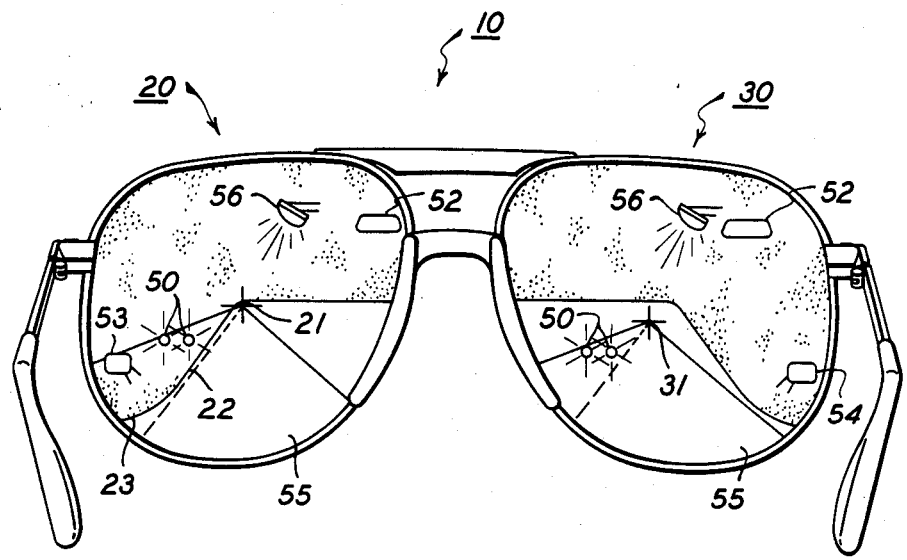

My preferred configuration of anti-dazzle screen material for night driving eyeglasses is shown in FIG. 2 as viewed from the driver's side with the left eyeglass region 20 to the left and the right eyeglass region 30 to the right. A pair of spectacles or eyeglasses 10 as illustrated provide a convenient frame for mounting anti-dazzle screen material in left eyeglass region 20 and right eyeglass region 30 in front of the driver's eyes. Otherwise, eyeglasses 10 can have corrective or non-correcting lenses formed of glass, resin, or combinations of glass and resin. Eyeglasses suitably screened for night driving can give the driver additional benefit by correcting his vision for night myopia. Eyeglasses 10 can also be made of photochromic glass to serve as sunglasses in bright daylight.

Figure 3:
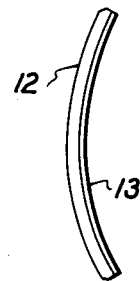

I prefer that screened regions of eyeglasses 10 transmit less than 40% of incident light, and I use a dye or filter material to block a portion of the light in regions that should be screened against glare. Since some regions of eyeglasses 10 are not screened, I have found that resin lenses or lenses formed as a laminate of glass 12 and resin 13 as shown in FIG. 3 afford a convenient way of practicing my invention. Lenses combining glass 12 and a laminate of polyurethane 13, for example, allow the resin layer 13 to be masked and dyed to produce the screened and unscreened regions according to my invention.

To show how screening regions are applied to eyeglasses 10, eyeglass regions 20 and 30 are marked with respective optical axes 21 and 31 that are points aligned respectively with the entrance pupils of the driver's left and right eyes as the driver gazes straight ahead down a lane of travel 55. Then, the screened and unscreened regions can be described from the driver's point of view relative to clock faces centered on optical axes 21 and 31.

To protect against the glare of oncoming headlights 50, my system screens an octant of left eyeglass region 20 between about 7:30 o'clock and about 9:00 o'clock. Moreover, since vital driving information comes from this region, I leave unscreened the corresponding octant from about 7:30 o'clock to about 9:00 o'clock of the driver's right eyeglass region 30. The screened octant in front of the left eye protects the driver from the glare of oncoming headlights 50, and the lack of screening in the corresponding octant in front of the driver's right eye assures that the driver's information is not reduced and that the driver is not made anxious from lack of information in a vital sector.

I also prefer screening an octant of right eyeglass region 30 from about 3:00 o'clock to about 4:30 o'clock and leaving the corresponding region of the left eyeglass 20 unscreened from about 3:00 o'clock to about 4:30 o'clock to protect the driver from glare discomfort from right side mirror 54 and any other glare sources to the lower right of the driver's field of view. Leaving the left eyeglass region 20 unscreened from about 3:00 o'clock to about 4:30 o'clock ensures that the driver does not lack driving information from that sector.

The viewing region above a horizontal through optical axes 21 and 31 contains very little driving information and many possible glare sources so that I prefer screening the upper halves of both eyeglass regions 20 and 30 from about 9:00 o'clock to about 3:00 o'clock. This reduces information above the horizontal, but does not give the driver an anxious deprivation feeling because night driving information comes mostly from regions below the optical axes. Screening the upper halves of eyeglass regions 20 and 30 from about 9:00 o'clock to about 3:00 o'clock blocks glare from street lights, signs, building lights, inside rear view mirror 52, and light reflected from dirt on the upper half of the windshield.

It is possible to screen the upper half of only one eyeglass region from about 9:00 o'clock to about 3:00 o'clock and eliminate glare effects without reducing information. I have found, however, that information lost from screening the upper half of both eyeglass regions is negligible and that glare relief can be enhanced by screening the upper halves of both eyeglass regions.

I prefer that screening not intersect both optical axes 21 and 31 so that for straight ahead viewing, one eye is clearly unscreened along its optical axis while the optical axis of the other eye borders on a screened region. To accomplish this, I prefer spacing the screening of the right eyeglass region slightly above and to the right of optical axis 31, while allowing the screening of left eyeglass region 20 to intersect optical axis 21. The result makes the screening of the right and left eyeglass regions similar but not quite symmetrical.

I have also found that the obliquely downward sloping edge 22 of the left eyeglass screening extending downward from optical axis 21 at about 7:30 o'clock can start downward at one angle and then curve toward the outer edge of eyeglass region 20 at another angle. I prefer that an inner length of obliquely downward sloping edge 22 be angled 30° to 50° below horizontal, and that an outer length 23 be angled 25° to 40° below horizontal. The angles and positioning of the downward sloping edge 22, 23 of the left eyeglass screening preferably projects from the entrance pupil of the driver's left eye along left edge 51 of driving lane 55 extending ahead of the driver's vehicle so as to screen oncoming headlights 50 that are normally to the left of lane edge 51. Toward the lower edge of eyeglass region 20, screened edge 23 can curve to a smaller angle below horizontal to project from the entrance pupil of the driver's left eye below the driver's left side view mirror 53. As oncoming headlights 50 pass to the left side of the driver, they no longer need to be screened. So screening to block oncoming headlights 50 could terminate short of the left edge of left eyeglass region 20 and still adequately protect the driver. But continuing the screening along edge 23 at a smaller angle below horizontal to project under the driver's left side mirror 53 shields the driver from mirror glare without loss of information.

In a similar way, I prefer that the screened region from about 3:00 o'clock to about 4:30 o'clock of right eyeglass 30 extend more steeply downward to the right of entrance pupil 31 and then curve toward the right edge of eyeglass region 30 to project from the driver's right entrance pupil under right side mirror 54.

Screened regions arranged as shown in FIG. 2 and as explained above result in nearly symmetrical-looking eyeglasses that are not too unusual. They can also be worn comfortably in daylight and for many purposes other than driving.

Roads do not always lie straight ahead, and night driving glare does not always come from the regions shown in FIG. 1. However, with the preferred configuration of screening as shown in FIG. 2, orientation of the driver's head to change viewing angle by only a few degrees will succeed in screening out most glare sources while preserving vital information. Altogether, my screening configuration substantially protects the driver from glare without diminishing information and thus improves the ease and safety of night driving.

I claim:

1. A night driving dazzle protection system using screened and unscreened portions of right and left eyeglass regions in front of a driver's eyes, said protection system, as viewed by the driver, comprising:
   a. screened portions of said eyeglass regions having anti-dazzle screen material transmitting less than 40% of incident light;
   b. octants of said right and left eyeglass regions located between about 7:30 o'clock and about 9:00 o'clock being screened for the driver's left eyeglass region and unscreened for the driver's right eyeglass region;
   c. an upper portion of one of said eyeglass regions being screened from about 9:00 o'clock to about 3:00 o'clock; and
   d. a screened portion of said right eyeglass region being spaced from an optical axis aligned with the entrance pupil of the driver's right eye and a screened portion of said left eyeglass region intersecting an optical axis aligned with the entrance pupil of the driver's left eye.

2. The protection system of claim 1 wherein octants of said right and left eyeglass regions located between about 3:00 o'clock and about 4:30 o'clock are screened for the driver's right eyeglass region and unscreened for the driver's left eyeglass region.

3. The protection system of claim 2 wherein an upper portion of each of said eyeglass regions is screened from about 9:00 o'clock to about 3:00 o'clock.

4. The protection system of claim 1 wherein an obliquely downward slope of said screened octant of said left eyeglass region has an inner length angled 30° to 50° below horizontal and an outer length angled 25° to 40° below horizontal.

5. The protection system of claim 4 wherein said downward slope curves between said inner and outer lengths.

6. The protection system of claim 1 wherein said anti-dazzle screen material is arranged on a pair of eyeglasses worn by the driver and said eyeglasses include resin material bearing said anti-dazzle screen material.

7. The protection system of claim 6 wherein said resin material is polyurethane, and said screen material is applied as a dye imbibed into the surface of said polyurethane.

8. The protection system of claim 7 wherein said eyeglasses are formed as laminates of resin material and photochromic glass to serve as a sunglass in sunlight.

9. The protection system of claim 6 wherein an upper portion of each of said eyeglass regions is screened from about 9:00 o'clock to about 3:00 o'clock, and octants of said right and left eyeglass regions located between about 3:00 o'clock and 4:30 o'clock are screened for the driver's right eyeglass region and unscreened for the driver's left eyeglass region.

10. In a night driving dazzle protection system arranging anti-dazzle screening material transmitting less than 40% of incident light through screened portions of right and left eyeglass regions in front of a driver's eyes, an improvement, as viewed by the driver, comprising:
   a. an eyeglass region in the view of the driver's left eye being screened between about 7:30 o'clock and about 9:00 o'clock and being screened on an optical axis aligned with the entrance pupil of the driver's left eye;
   b. an eyeglass region in the view of the driver's right eye being unscreened between about 7:30 o'clock and about 9:00 o'clock and being unscreened on an optical axis aligned with the entrance pupil of the driver's right eye; and
   c. an upper portion of one of said eyeglass regions being screened from about 9:00 o'clock to about 3:00 o'clock.

11. The protection system of claim 10 wherein an eyeglass region in the view of the driver's right eye is screened between about 3:00 o'clock and about 4:30 o'clock, and an eyeglass region in the view of the driver's left eye is unscreened between about 3:00 o'clock and about 4:30 o'clock.

12. The protection system of claim 10 wherein an upper portion of each of said eyeglass regions is screened from about 9:00 o'clock to about 3:00 o'clock.

13. The protection system of claim 10 wherein an eyeglass region in the view of the driver's right eye is screened between about 3:00 o'clock and about 4:30 o'clock, and an eyeglass region in the view of the driver's left eye is unscreened between about 3:00 o'clock and about 4:30 o'clock.

14. The protection system of claim 13 wherein said anti-dazzle screen material is arranged on a pair of eyeglasses worn by the driver and configured for correcting the driver's vision for night myopia.

15. A method of protecting a driver's eyes from night driving dazzle, said method comprising:
   a. screening at least 60% of incident light viewed by the driver's left eye through a region extending from about 7:30 o'clock to about 9:00 o'clock;
   b. not screening any incident light from the view of the driver's right eye in a region extending from about 7:30 o'clock to about 9:00 o'clock;
   c. screening an optical axis aligned with the entrance pupil of the driver's left eye and not screening an optical axis aligned with the entrance pupil of the driver's right eye; and
   d. screening at least 60% of the incident light from an upper portion of one of the said eyeglass regions from about 9:00 o'clock to about 3:00 o'clock.

16. The method of claim 15 including screening at least 60% of incident light viewed by the driver's right eye through a region extending from about 3:00 o'clock to about 4:30 o'clock and not screening any incident light from the view of the driver's left eye in a region extending from about 3:00 o'clock to about 4:30 o'clock.

17. The method of claim 16 including screening at least 60% of incident light from the view of both of the driver's eyes in an upper region extending from about 9:00 o'clock to about 3:00 o'clock.

* * * * *